June 26, 1928.

W. G. THOMAS

REELING DEVICE

Filed July 28, 1926

1,674,709

INVENTOR
W. G. Thomas
BY James E. Lynch
ATTORNEY

Patented June 26, 1928.

1,674,709

UNITED STATES PATENT OFFICE.

WILLIAM GRADY THOMAS, OF HAMDEN, CONNECTICUT, ASSIGNOR TO AMERICAN TELEPHONE AND TELEGRAPH COMPANY, A CORPORATION OF NEW YORK.

REELING DEVICE.

Application filed July 28, 1926. Serial No. 125,566.

This invention relates to reels, and more particularly to reels adapted to carry coils of wire.

An object of the invention consists in the provision of a reel adapted to pay out wire from coils placed thereon and rewind the wire on the reel with ease and facility.

Another object consists in providing a reel upon which wire may be so wound thereon that it may be removed in coil formation.

A further object of the invention is to provide a reel which is light and portable, efficient in operation, and simple and inexpensive to manufacture.

These and further objects of the invention will be apparent from the following description, when considered in connection with the accompanying drawing, in which one embodiment of the invention is illustrated.

In the preferred form of the invention there is provided a reel having a base with an affixed spindle to support the reel mounted on the base. The reel has a lower portion to support a coil of wire. A core is provided for the reel which, in one position, is adapted to be collapsed to receive a coil of wire, and, in another position, to be extended to retain the coil of wire in position.

Figure 1:
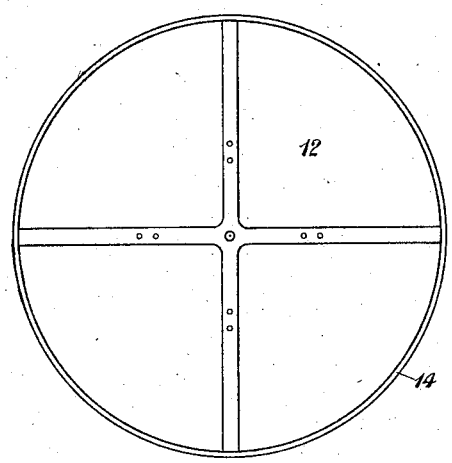
Figures 3, 4:
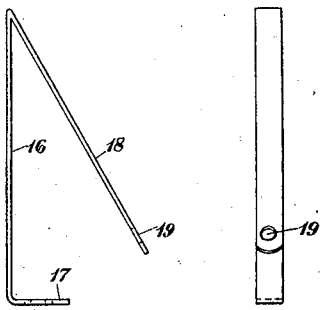
Figure 2:
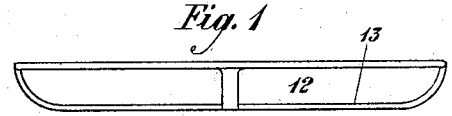
Figure 5:
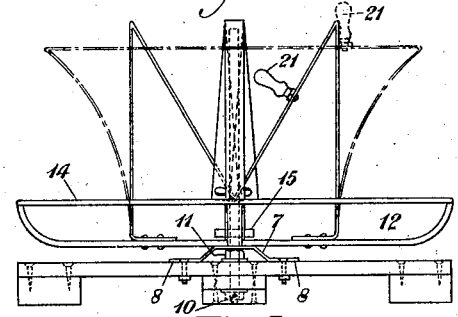
Figure 6:
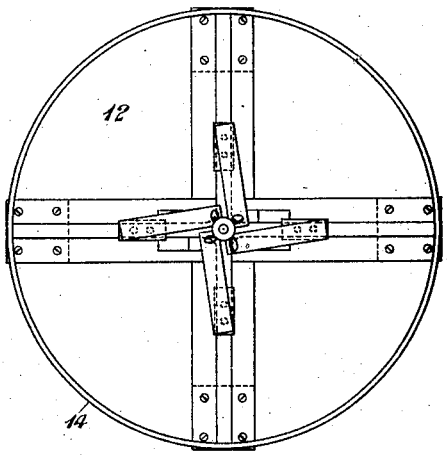
Figure 7:
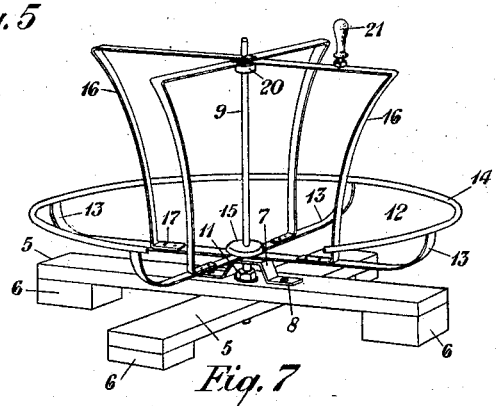

Referring to the drawing, Figure 1 illustrates a top plan view of a dish-shaped frame comprising the bottom portion of the reel upon which a coil of wire may be supported; Fig. 2 is a side elevation thereof; Fig. 3 is a side elevation of a reel horn or resilient member, a plurality of which comprises the core with each disposed at intervals upon the bottom portion shown in Fig. 1; Fig. 4 is an end view of Fig. 3; Fig. 5 is an elevation of the assembled reel seated on its base, showing the reel horns in collapsed position in full lines, and in extended position in dotted lines; Fig. 6 is a top plan view of Fig. 5; and Fig. 7 is a perspective view of the assembled reel seated upon a base.

The embodiment of the invention illustrated in the drawing shows the reel supported on a base which, in the present instance, comprises a pair of intersecting cross-members 5 having feet 6 provided on their ends. Although the reel is shown as supported upon a certain form of base in the present case for the purpose of illustration, it will be apparent that other suitable mountings may be provided therefor. For instance, it is equally well adapted to be mounted on suitable bracket members upon a truck body or the like.

An opening is provided through the cross-members 5 at the center of the intersecting portions, and upon the upper cross-member 5 a bearing member 7 may be seated. The bearing member 7 may be of the form indicated, having end portions 8 affixed to the upper cross-member 5 and an intermediate raised portion may be provided between the ends 8. An opening may be provided in the raised portion above the opening in the cross-members and in alinement therewith. A vertically extending spindle 9 has one of its ends projecting through the alined openings in the bearing member 7 and the cross-members 5. The projecting end of the spindle may have a washer and nut 10 applied thereto, which rest against the bottom surface of the lower cross-member. A corresponding washer and nut 11 may be applied to said spindle, which may rest against the top surface of the upper cross-member 5. The nuts 10 and 11 serve to securely clamp the spindle in fixed position on said cross-members.

A disk-like member in the present case shown by frame 12 is rotatably mounted on the spindle 9 through the medium of its intersecting radial arms 13. These arms have an opening provided at their axis to permit the mounting of the frame on the spindle, so that when the frame is seated, it rotates on said spindle on the surface provided by the raised portion of the bearing member 7. The radial arms 13 are curved in an upward direction near their outer portions, and their extremities are affixed in any desired and suitable manner to a ring 14. This ring is positioned above the horizontal portions of said arms and in concentric relation to the axis thereof and to the spindle 9. The member 12 retains any enlarged turns of wire which may extend from the coil and prevents catching of any loose turns on the base or other parts of the reel as the wire is payed out.

A collar 15 is affixed to the spindle 9 a proper distance above the intersecting portions of the arms 13 to permit free and unimpaired rotation of the frame 12 thereon. If it is desired to introduce a braking action for the frame, the collar may be so placed on the spindle as to regulate the rotation of the frame by providing desired pressure against the upper surface of the frame. This collar is of such dimension and so positioned on the spindle that it will prevent any undue tipping action or excess vertical movement of the frame on the spindle.

A series of horn members 16, which are composed of some suitable resilient material, such as spring-steel, form a core for the improved reel. The horn members 16 are each provided with substantially L-shaped portions having their ends pointing toward the spindle. The horizontal portions 17 of these L-shaped members are attached to the approximate middle of the radial arms 13 by rivets or the like. The members 16 when in a collapsed or normal position, assume a form similar to a triangle as more clearly indicated in Fig. 3. When collapsed, the arms 16 lie in a perpendicular position and the arms 18 in an inclined position.

When the core is collapsed, it is adapted to have a formed coil of wire introduced thereon through the eye provided in the coil. The core, when in collapsed form, is also adapted to have wire wound about it. When a sufficient amount has been wound to make a coil, it may be removed from the reel in this formation.

When the core is in an extended position, the arms 18 are sprung in an upward direction. The extremities thereof are then forced toward the spindle and snapped over its top through the apertures 19 provided near said extremities. The ends of the arms then rest one upon the other on the top of collar 20. When in this position, the arms 18 assume a substantially horizontal position and the arms 16 an arcuate form. The tension exerted on the horn members when in this position is such that there is no danger of the horizontally positioned arms 18 becoming dislodged from the spindle. The upper part of the horn members when in extended position form a flange which serves to retain a coil of wire on the core and prevents its upward displacement. The extended core also exerts tension through its horn members on the eye of a coil of wire seated thereon to maintain it in place.

A handle 21 may be attached to one of the arms 18 if desired, as shown in Figs. 5 and 7 for the purpose of winding wire upon the reel.

While the arrangements of this invention have been illustrated in certain specific forms which have been deemed desirable, it will be understood that they are capable of embodiment in many and widely varied forms without departing from the spirit of the invention as defined in the appended claims.

What is claimed is:

1. In a device for reeling wire, comprising a base and spindle, a support rotatably mounted on the spindle, having a depressed portion for seating a coil of wire and confining loose turns of the wire within said portion, and a core associated with the support in a collapsed position and associated with the support and the spindle in an extended position, said core in the latter position comprising spaced members having horizontal portions connected to said spindle and bowed portions connected to said support with an intermediate flange to retain the coil on said core.

2. In a device for reeling wire, comprising a base and spindle, a support rotatably mounted on the spindle, having a depressed portion substantially in the form of a dish-shaped frame for seating a coil of wire and confining loose turns of the wire within said portion, and a core associated with said support adapted to be collapsed in one position to have wire wound thereon in coil formation, and extended in another position to form a bowed portion to provide pressure to the interior of said coil to retain it in position on said core.

3. In a device for reeling wire, comprising a base and spindle, a support rotatably mounted on the spindle, having a depressed portion for seating a coil of wire and confining loose turns of the wire within said portion, and a core associated with the support in a collapsed position, and with the support and spindle in an extended position, said core in the collapsed position being adapted to receive a formed coil of wire and in the extended position being adapted to exert an outward pressure on the interior of said coil to retain it in position on the core.

4. In a device for reeling wire, a base and spindle, a support for the wire rotatably mounted on the spindle, said support comprising a dish-like frame having an annular member with intersecting arms connected therewith, a core having members individually associated with each arm, said members being adapted to assume a collapsed position and disassociated from said spindle to receive a coil of wire, and an extended position in association with the spindle to retain said coil in place, and a handle for rotating said support and frame.

5. In a device for reeling wire, a base and a spindle, a support for the wire rotatably mounted on the spindle, said support comprising a frame having an annular member concentric with said spindle with arms extending downwardly therefrom and intersecting at the pivotal point of the support, and a core associated with said frame adapted to assume a collapsed and extended position, said core comprising resilient members in normal, collapsed position of substantially triangular form and disassociated from said spindle, said members in extended position having horizontal portions associated with the spindle and bowed portions extending therefrom to the arms of the support.

In testimony whereof, I have signed my name to this specification this 17th day of July, 1926.

WILLIAM GRADY THOMAS.